United States Patent
MacQuarrie et al.

(10) Patent No.: US 9,116,807 B2
(45) Date of Patent: *Aug. 25, 2015

(54) HANDLING INTERMITTENT RECURRING ERRORS IN A NETWORK

(71) Applicant: International Business Machines Corporation, Armonk, NY (US)

(72) Inventors: Ian A. MacQuarrie, San Jose, CA (US); James A. O'Connor, Ulster Park, NY (US); Limei Shaw, San Jose, CA (US); Thomas Walter, Freiburg (DE); Thomas V. Weaver, Dripping Springs, TX (US); Shawn T. Wright, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/790,755

(22) Filed: Mar. 8, 2013

(65) Prior Publication Data
US 2014/0053014 A1    Feb. 20, 2014

Related U.S. Application Data

(63) Continuation of application No. 13/586,405, filed on Aug. 15, 2012.

(51) Int. Cl.
*G06F 11/20* (2006.01)
*G06F 11/07* (2006.01)
*H04L 12/703* (2013.01)

(52) U.S. Cl.
CPC ........ *G06F 11/0793* (2013.01); *G06F 11/2007* (2013.01); *H04L 45/28* (2013.01)

(58) Field of Classification Search
CPC . G06F 11/2007; G06F 3/0629; G06F 3/0617; H04L 43/08; H04L 4/0823; H04L 4/0829; H04L 4/0835; H04L 4/16; H04L 45/08; H04L 45/22; H04L 45/28
USPC ........... 714/4.1, 4.11, 4.12; 709/239; 370/333
See application file for complete search history.

(56) References Cited

U.S. PATENT DOCUMENTS

| 4,330,885 A | * | 5/1982 | Abbott et al. ........... 370/217 |
| 5,699,511 A | * | 12/1997 | Porcaro et al. ........... 714/55 |
| 5,933,422 A | * | 8/1999 | Kusano et al. .......... 370/331 |

(Continued)

FOREIGN PATENT DOCUMENTS

CN    102263807 A    11/2011

OTHER PUBLICATIONS

Wikipedia's Fibre Channel historical version from Mar. 24, 2012 http://en.wikipedia.org/w/index.php?title=Fibre_Channel&oldid=483657860.*

(Continued)

*Primary Examiner* — Joseph Schell
(74) *Attorney, Agent, or Firm* — Cantor Colburn LLP; Steven Chiu

(57) ABSTRACT

Embodiments relate to a computer for transmitting data in a network. The computer includes at least one data transmission port configured to be connected to at least one storage device via a plurality of paths of a network. The computer further includes a processor configured to detect recurring intermittent errors in one or more paths of the plurality of paths and to disable access to the one or more paths based on detecting the recurring intermittent errors.

5 Claims, 7 Drawing Sheets

(56) References Cited

U.S. PATENT DOCUMENTS

| | | | |
|---|---|---|---|
| 6,148,421 A | 11/2000 | Hoese et al. | |
| 6,178,448 B1 * | 1/2001 | Gray et al. | 709/224 |
| 6,571,355 B1 | 5/2003 | Linnell | |
| 6,769,071 B1 | 7/2004 | Cheng et al. | |
| 6,952,734 B1 * | 10/2005 | Gunlock et al. | 709/227 |
| 6,982,951 B2 * | 1/2006 | Doverspike et al. | 370/217 |
| 7,281,169 B2 | 10/2007 | Golasky et al. | |
| 7,350,114 B2 | 3/2008 | Moody, II et al. | |
| 7,577,399 B2 * | 8/2009 | Eichinger et al. | 455/11.1 |
| 7,962,567 B1 | 6/2011 | Sandstron et al. | |
| 8,069,364 B2 | 11/2011 | Coronado et al. | |
| 8,203,938 B2 * | 6/2012 | Gibbings | 370/228 |
| 8,291,267 B2 * | 10/2012 | Blum | 714/48 |
| 2002/0059432 A1 * | 5/2002 | Masuda et al. | 709/227 |
| 2002/0065962 A1 | 5/2002 | Bakke et al. | |
| 2004/0078632 A1 | 4/2004 | Infante et al. | |
| 2005/0120259 A1 * | 6/2005 | Aoki | 714/5 |
| 2006/0075156 A1 | 4/2006 | Okaki et al. | |
| 2009/0182961 A1 | 7/2009 | Astigarraga et al. | |

OTHER PUBLICATIONS

Wikipedia's Fibre Channel time-out values historical version from Nov. 24, 2011 http://en.wikipedia.org/w/index.php?title=Fibre_Channel_time-out_values&oldid=462234239.*

International Search Report and Written Opinion for International Application No. PCT-IB2013-056428; International Filing Date: Aug. 2, 2013; Date of Mailing: Jan. 2, 2014; 9 pages.

U.S. Appl. No. 13/586,405; Notice of Allowance; Date Filed: Aug. 15, 2012; Date Mailed: Feb. 2, 2015: 9 pages.

* cited by examiner

US 9,116,807 B2

HANDLING INTERMITTENT RECURRING ERRORS IN A NETWORK

CROSS-REFERENCE TO RELATED APPLICATIONS

This is a continuation application of and claims priority from U.S. application Ser. No. 13/586,405, filed on Aug. 15, 2012, the entire contents of which are incorporated herein by reference.

BACKGROUND

The present disclosure relates to the handling of intermittent recurring errors in a network, and in particular to storing and pattern analysis of a history of error information for paths in a network and identifying and correcting intermittent recurring errors.

Storage area networks (SANs) enable large numbers of servers to access common storage via a network of switches and cabling. During operation, error detection may be performed to improve performance of the network. Permanent errors include catastrophic errors in a data path, such as ones caused by permanent damage to hardware components. With permanent errors, all data transmission operations routed to the target path result in failures. Permanent errors are identified by detecting an error in a data path, retrying a data transmission operation in the data path, and detecting the error again in the data path.

Temporary errors include transient conditions, such as bit flips due to radiation, electrical noise, and code defects. Temporary errors tend to be isolated events that do not cause serious problems in the system, and may often go undetected. If a temporary error is detected, then a data transmission is re-attempted on a path in which the temporary error was detected. If the re-attempt is successful then the temporary error may be disregarded.

However, conventional systems may not be capable of detecting intermittent recurring errors. Intermittent recurring errors may occur as a result of marginal components or components that are operating outside of their normal operation range, such as a data traffic level. Intermittent recurring errors may be detected in an initial data transmission operation, may be undetected in a next data transmission operation, and may occur again at a later data transmission operation. Thus, when a re-try operation is performed after detecting an intermittent recurring error, the re-try error operation may result in a successful data transmission, and the data path having the intermittent recurring error may be restored to allow data to be transmitted along the path. In subsequent operations, the intermittent recurring error may again occur, causing repeated delays in data packet transmission through the network which can eventually have application level performance impact and even cause application failure.

SUMMARY

Exemplary embodiments include a computer for transmitting data in a network. The computer includes one or more data transmission ports configured to be connected to at least one storage device via a plurality of paths of a network. The computer further includes a processor configured to detect recurring intermittent errors in one or more paths of the plurality of paths and to disable access to the one or more paths based on detecting the recurring intermittent errors.

Additional exemplary embodiments include a computer system including storage, a data communication fabric, and a computer connected to the storage via a plurality of paths of the data communication fabric. The computer is configured to detect recurring intermittent errors in one or more paths of the plurality of paths and to disable access to the one or more paths based on detecting the recurring intermittent errors.

Further exemplary embodiments include a computer program product for transmitting data in a network. The computer program product includes a tangible storage medium readable by a processing circuit and storing instructions for execution by the processing circuit for performing a method. The method includes initiating, by a processor, a data transmission operation from the processor to a storage device via a network, the network including a plurality of paths between the processor and the storage device. The method further includes detecting, by the processor, a recurring intermittent error in one or more paths of the plurality of paths and disabling access to the one or more paths based on detecting the recurring intermittent error.

Further exemplary embodiments include a method for transmitting data in a network. The method includes initiating, by a processor, a data transmission operation from the processor to a storage device via a network, the network including a plurality of paths between the processor and the storage device. The method further includes detecting, by the processor, a recurring intermittent error in one or more paths of the plurality of paths and disabling access to the one or more paths based on detecting the recurring intermittent error.

Additional features and advantages are realized through the techniques of the present disclosure. Other embodiments and aspects of the present disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Intermittent recurring errors are difficult to detect and cause delays in conventional computer systems. Embodiments of the present disclosure are directed to detecting intermittent recurring errors in paths of a network and disabling access to the paths based on detecting the intermittent recurring errors.

Figure 1A:
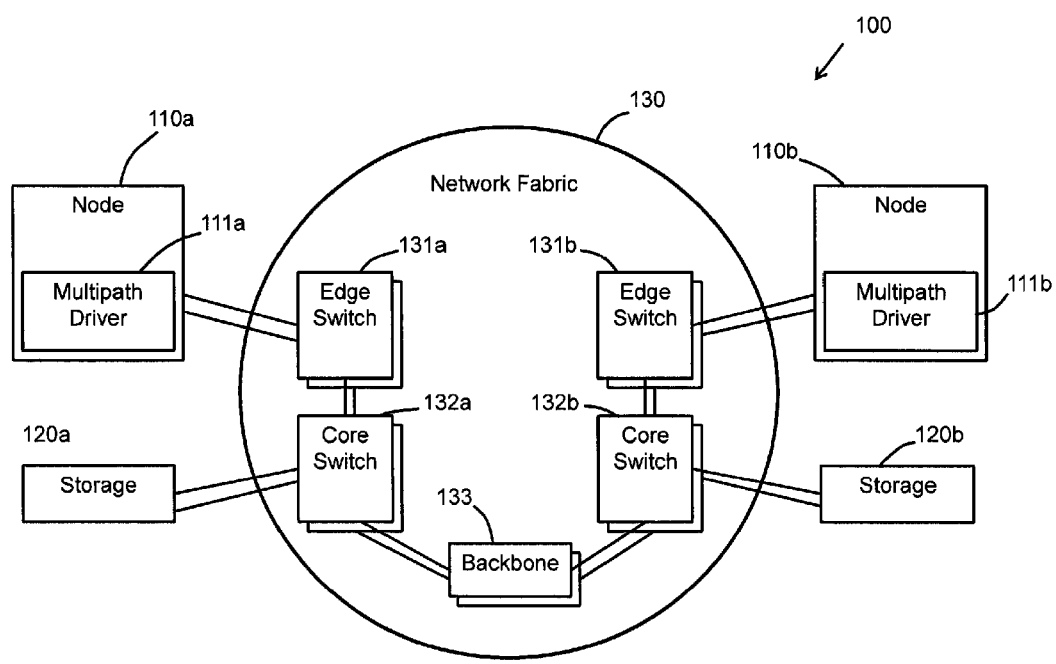
FIG. 1A illustrates a system according to one embodiment.

FIG. 1A illustrates a system 100 according to one embodiment of the present disclosure. The system 100 includes one or more nodes 110, such as nodes 110a and 110b. The number of nodes 110 may be any number, such as between one node 110 and one hundred nodes 110. The system 100 further includes storage 120, such as storage 120a and 120b and a network fabric 130. The nodes 110a and 110b may be connected to the storage 120a and 120b via the network. The nodes 110a and 110b may be computers, such as personal computers, mainframe computers, or any other type of computer capable of communicating and transmitting data via the network fabric 130.

The storage 120a may include any type of storage, such as volatile and non-volatile memory devices, storage management systems, and storage controllers. For example, in one embodiment, one or more of the storage 120a and 120b may include a storage area network (SAN) volume controller (SVC) or a DS8000 device or system by International Business Systems Corporation (IBM).

The network fabric 130, also referred to as data communication fabric 130, may include one or more servers or switches, such as edge switches 131a and 131b and core switches 132a and 132b. In one embodiment, the nodes 110a and 110b connect to the network fabric 130 via the edge switches 131a and 131b. The core switches 132a and 132b may be connected to the storage 120a and 120b, and the edge switches 131a and 131b may connect the nodes 110a and 110b to the storage 120a and 120b via the core switches 132a and 132b.

In one embodiment, the edge switches 131a and 131b depicted in FIG. 1A each include a plurality of edge switches 131a and 131b. Similarly, the core switches 132a and 132b may each include a plurality of core switches 132a and 132b. In addition, the core switches 132a and 132b may connect to each other via a backbone 133. The backbone 133 may include, for example, transmission media, such as wires, optical cables, or other transmission media as well as repeaters and any other hardware for transmitting signals between the core switches 132a and 132b. In some embodiments, the backbone 133 may include one or more storage area network (SAN) switches.

Each of the nodes 110a and 110b may include a multipath driver 111a and 111b configured to access the storage devices 120a and 120b via a plurality of paths of the network fabric 130. Each path of the network fabric 130 may comprise a different combination of edge switches 131a or 131b, core switches 132a or 132b and backbone 133 paths. For example, in an embodiment in which the edge switch 131a includes a plurality of edge switches 131a and the core switch 132a includes a plurality of core switches 132a, the multipath driver 111a may select a path defined by one of the plurality of edge switches 131a and one of the plurality of core switches 132a for communicating with the storage 120a. In another operation, the multipath driver 111a may select another path defined by another one of the plurality of edge switches 131a and another one of the plurality of core switches 132a for communicating with the storage 120a.

The selection of the path for communicating with the storage 120a may be based on any consideration, such as a round-robin selection of paths, measured or predicted capacity of the paths, errors detected on the paths, or any other consideration. In embodiments of the present disclosure, a node 110a may access storage devices 120a and 120b singly or at the same time, such as when mirroring data.

Figure 1B:
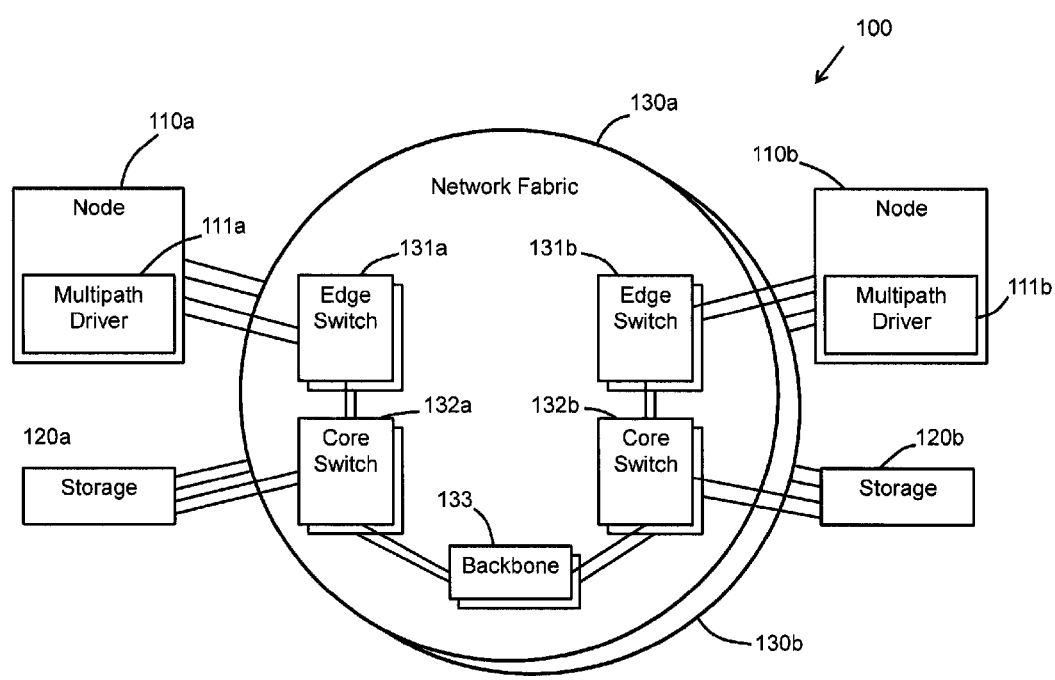
FIG. 1B illustrates a system according to another embodiment.

FIG. 1B illustrates another embodiment in which a second completely independent network fabric 130b is provided. Such a structure would handle even the most disruptive recurring intermittent issues in either network fabric 130a or 130b. Even if all the paths in any one network fabric 130a or 130b were to become disabled, a path through the other network fabric 130a or 130b could continue to be utilized.

Figure 2:
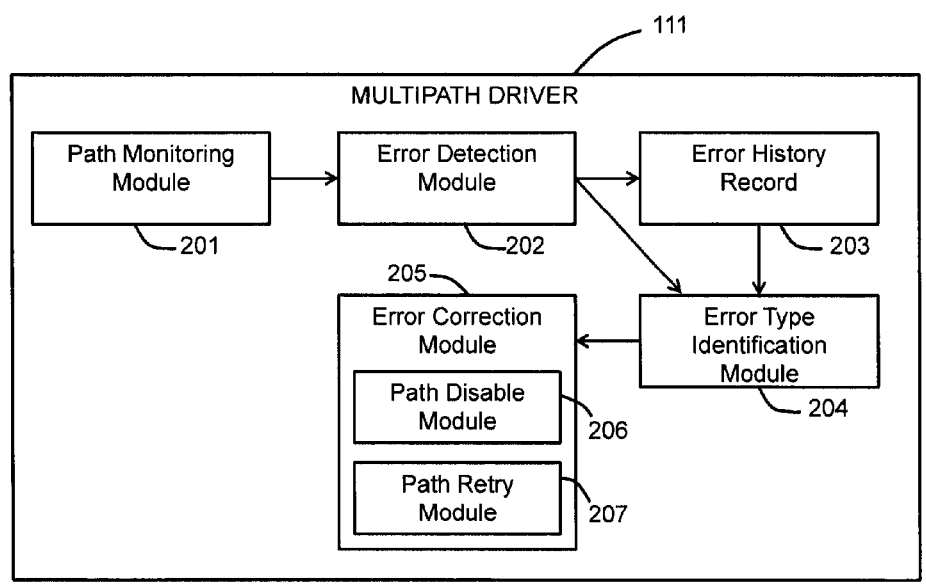
FIG. 2 illustrates a functional block diagram of a multipath driver according to one embodiment.

FIG. 2 illustrates a block diagram of a multipath driver 111 according to embodiments of the present disclosure. The multipath driver 111 may include any combination of hardware and software necessary to control communication between the node 110 and storage 120 via a plurality of paths of the network fabric 130. The multipath driver 111 includes a path monitoring module 201 for detecting characteristics of a path in the network fabric 130. For example, the path monitoring module 201 may detect a response time of a path, noise in the path, or any other characteristic of the path. An error detection module 202 may detect an error in the path based on the monitored characteristics. For example, the error detection module 202 may monitor the response time of the path and determine whether the response time exceeds a time-out threshold. The error detection module 202 records detected errors in the error history record, and the error type identification module 204 identifies a type of error. For example, the error type identification module 204 may detect whether the error is a permanent error, a temporary error, or an intermittent recurring error.

The error correction module 205 may control access to the paths of the network based on the identified error type. For example, if the error type identification module 204 determines that an error has been detected in a path and that the error has not previously been detected in the path, the error type identification module 204 designate the error as "temporary" and the error correction module 205 may retry accessing the path with the path retry module 207. If the error is again detected in the path within a predetermined number of retry attempts, the error may be designated by the error type identification module 204 as "permanent", and the error correction module 205 may permanently disable the path with the path disable module 206.

Designating an error as "temporary" or "permanent" may not necessarily include attaching any particular designation to the error in memory or storage, but may include performing distinct functions, such as performing a re-try for communicating via a path or disabling the path, respectively.

On the other hand, if after retrying the path module the error is not detected, the path may be maintained in an enabled state, or the path may be made available for accessing the storage 120 via the network fabric 130. If an error is again detected on the path in a later, non-consecutive, operation accessing the path, the error type identification module 204 may determine whether the error is an intermittent recurring error. For example, the error may be designated as an "intermittent recurring" error if a predetermined number of errors are detected on the path within a predetermined period of time or within a predetermined number of operations accessing the path. In addition, the error may be designated as an "intermittent recurring" error if a predetermined number of cumulative errors is detected on the path. In other words, the error may be designated as an "intermittent recurring" error based on any criteria in which errors are not detected in consecutive path access operations and an error history is analyzed to determine that an error recurs on the path.

In addition to designating an error as an "intermittent recurring" error based on historical error information, an error may be designated as an "intermittent recurring" error based on historical recovery information, such as a number of times that a recovery event has been performed on a given path. In addition, other error characteristics may be considered to determine whether an error is an intermittent recurring error, such as error type, network fabric 130 characteristics, and node 110 characteristics.

In embodiments of the present disclosure, when the error type identification module 204 determines that the error is an intermittent recurring error, the error correction module 205 may determine whether to disable the path with the path disable module 206. For example, the error correction module 205 may determine a burden that would be placed on the node 110 or the network fabric 130 by disabling the path and may compare the burden to a threshold burden. If the determined burden is greater than the threshold burden, the path may be maintained open or enabled in spite of the intermittent recurring error. On the other hand, if the determined burden is not greater than the threshold burden, then the path disable module 206 may disable the path to prevent the intermittent recurring error from recurring.

The burden to the node 110 or the network fabric 130 may include any metric, such as a delay in data transmission, a likelihood of a catastrophic data event such as a system stall or system crash, a number of remaining enabled paths, or any other desired metric.

Figure 3:
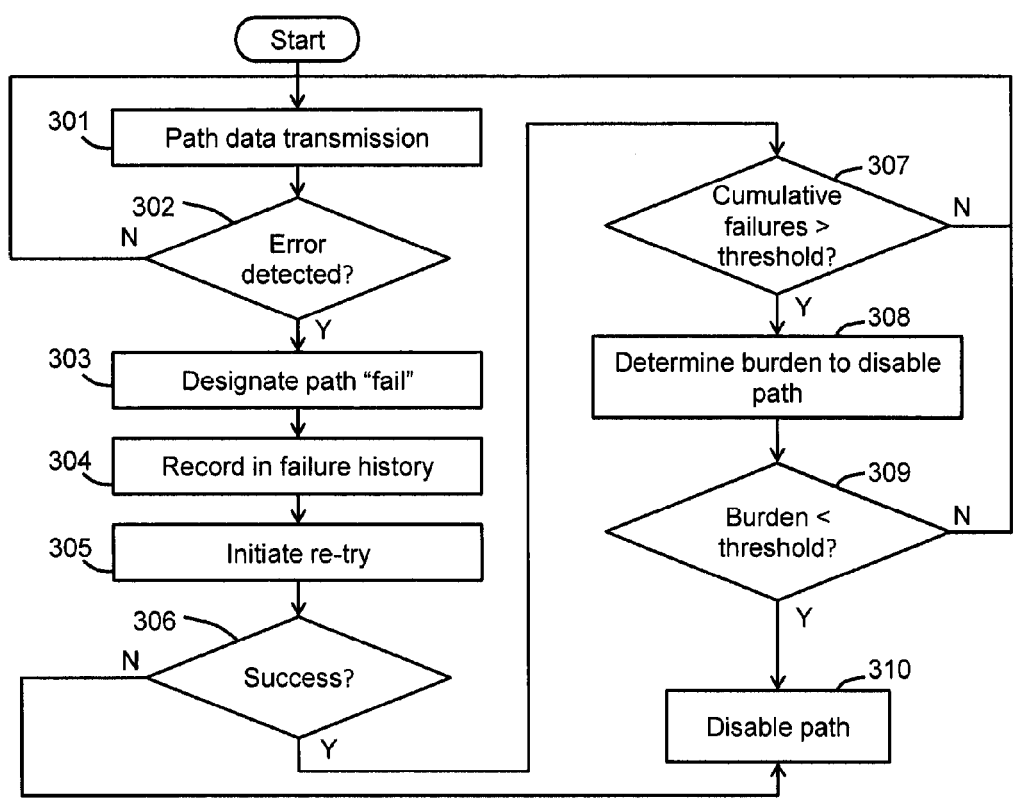
FIG. 3 illustrates a flowchart of a method according to one embodiment.

FIG. 3 illustrates a flowchart of a method according to an embodiment of the present disclosure. In block 301 a data transmission is issued on a path of a network fabric. The data transmission may be a command, a request for access, or any other type of data transmission via the path having a response that may be monitored. In block 302 it is determined whether an error is detected on the path. The error may be a time-out condition, or any other type of error. The time-out condition may be, for example, a determination that a predetermined period of time has elapsed without completion of a requested data transmission operation.

If an error is detected in block 302, a failure status is generated in block 303. The failure status may be recorded in block 304. For example, a database or other memory may store error information about each path. The error information may be stored indefinitely or for only a predetermined period of time after detecting the error. When the error is detected in block 302, an error designator, such as "fail" may be associated with the path. Alternatively, a sequence of events may be initiated based on the error detection without explicitly associating a particular label with the path.

In block 305, a re-try operation is performed. In a re-try operation, the path data transmission is re-attempted on the same path on which the error has been detected. The re-attempt may be performed a predetermined number of times or for a predetermined duration of time. In other words, when a path is designated "fail", a re-try operation may be performed on the path for a predetermined number of times. If it is determined in block 306 that the re-try attempt is unsuccessful, then the error designation may be changed to "disable", corresponding to a permanent error and the path may be disabled in block 310.

If it is determined in block 306 that the path data transmission is successful based on the re-try attempt, a sequence of operations may be initiated to determine whether the error is a temporary error or an intermittent recurring error. The failure or error history may be consulted in block 307 to determine whether a number of failures on the path is greater than a predetermined threshold number of failures. In one embodiment, a cumulative number of failures of a path is compared to the predetermined threshold within a predetermined time frame, such as one minute, eight minutes, one hour, ten hours, etc. In another embodiment, a cumulative number of failures of the path is compared to the predetermined threshold without regard to a time frame. In another embodiment, the thresholds are dynamically adjusted in response to repeated data packet transmission delay to application level performance changes.

If it is determined in block 307 that the number of cumulative failures is greater than the predetermined threshold, the error may be designated as an intermittent recurring error. In particular, it is determined that the path has an error that recurs in non-consecutive data transmission attempts. If the error is determined to be an intermittent recurring error, then in block 308 a burden caused by disabling the path may be determined. The burden may be any metric to measure a detrimental effect to the system, such as an additional delay to the system that would be caused by disabling the path, a loss of data transmission capacity, a predetermined number of disabled paths, or any other measurable burden to the system.

In block 309, it is determined whether the burden would exceed a predetermined threshold. For example, in one embodiment, it is determined whether disabling the path would slow the system to a greater extent than permitting the path to remain enabled. In another embodiment, it may be determined whether disabling the path would result in a number of enabled paths less than a predetermined threshold. In one embodiment, it may be determined whether the path in which the error is detected is the last enabled path. If it is determined that the burden would be less than the predetermined threshold, the path may be disabled in block 310. On the other hand, if it is determined in block 309 that the burden would not be less than the threshold, the path may remain enabled.

As discussed above, embodiments of the present disclosure identify intermittent recurring errors in a data transmission system based on pattern analysis of historical error data. In addition, a determination may be made regarding whether to disable a path by determining whether disabling the path would create a burden to the system greater than a desired burden. Accordingly, the reliability of a system may be improved by recognizing intermittent recurring errors and selectively correcting the errors based on predetermined criteria.

Figure 4:
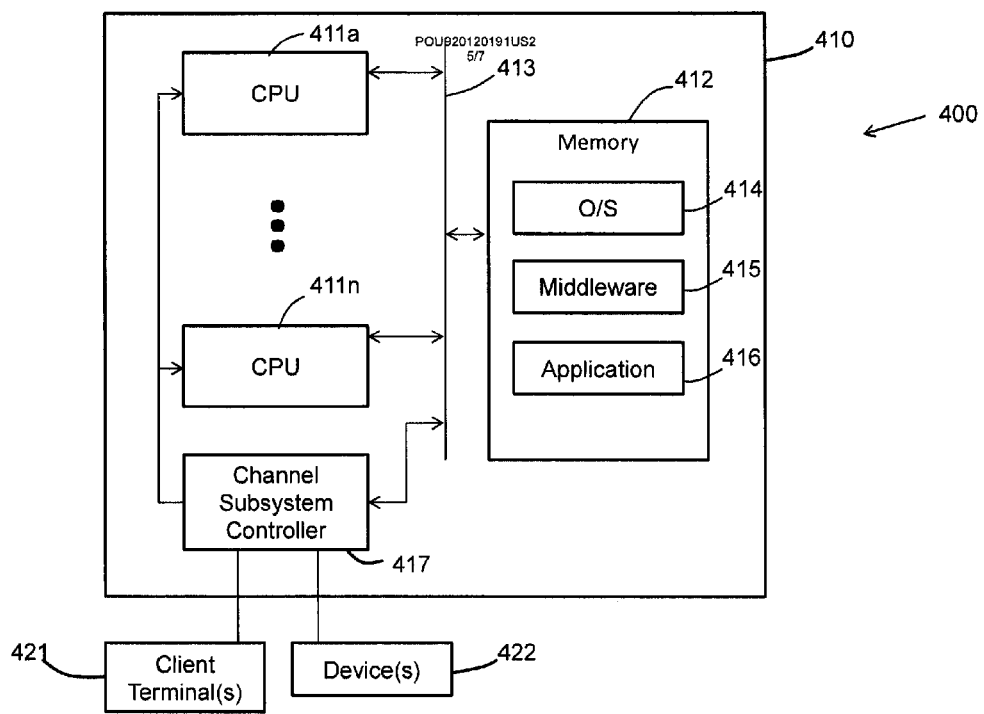
FIG. 4 illustrates a mainframe computer according to one embodiment.

Embodiments of the present disclosure encompass any type of computer system capable of managing memory. FIG. 4 illustrates a computer system 400 according to one embodiment of the present disclosure. The computer system 400 may be a node 110 of FIG. 1A or 1B, for example. The computer system 400 may correspond to a mainframe-type computer system in which multiple client terminals may access the mainframe computer and may be managed by the mainframe computer.

The system 400 includes a host computer 410. The host computer 410 includes one or more CPUs 411a-411n configured to access memory 412 via a bus 413. Memory 412 may store an operating system 414, middleware 415, and applications 416. A channel subsystem controller 417 may access external devices, such as client terminals 421 and other devices 422, including printers, display devices, storage devices, I/O devices, or any other device capable of communication with the host computer 410. The subsystem controller 417 may include the multipath driver 111 of FIGS. 1A, 1B and 2, for example.

In some embodiments, as each client terminal 421 accesses the host computer 410, one or more CPUs 411a-411n may be designated to correspond to the client terminal 421, and instances of the O/S 414, middleware 415, and applications 416 may be opened to interact with separate client terminals 421, such as by creating virtual computers corresponding to each client terminal 421 within the host computer 410.

In some embodiments of the present disclosure, the O/S 414 stores information for controlling the VSM and RSM to manage memory 410 according to the above-described embodiments.

Figure 5:
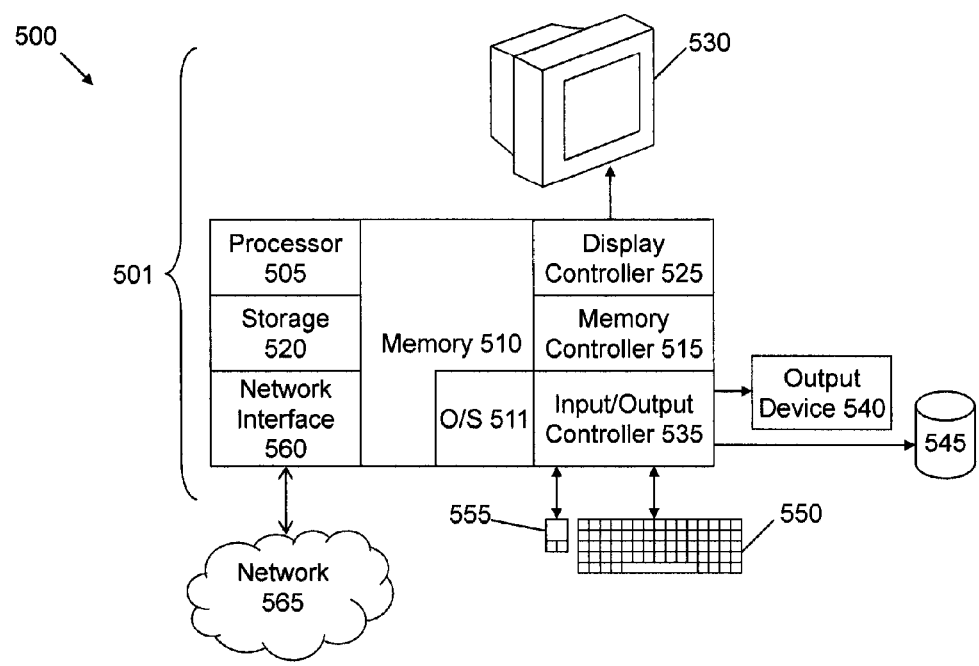
FIG. 5 illustrates a computer system according to one embodiment.

FIG. 5 illustrates a block diagram of a computer system 500 according to another embodiment of the present disclosure. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore may include general-purpose computer or mainframe 501. The computer 501 may correspond to the node 110 of FIG. 1A or 1B, for example.

In an exemplary embodiment, in terms of hardware architecture, as shown in FIG. 5, the computer 501 includes a one or more processors 505, memory 510 coupled to a memory controller 515, and one or more input and/or output (I/O) devices 540, 545 (or peripherals) that are communicatively coupled via a local input/output controller 535. The input/output controller 535 can be, for example, one or more buses or other wired or wireless connections, as is known in the art. The input/output controller 535 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 535 may access the output devices 540 and 545.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (O/S) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be any type of network, such as an IP-based network for communication between the computer 501 and any external server, client and the like via a broadband connection, an optical fiber network, or any other type of network. The network interface 560 may correspond to the multipath driver 111 of FIGS. 1A, 1B and 2, and the network 565 may correspond to the network fabric 130 of FIG. 1A or 1B.

The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods of managing memory described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
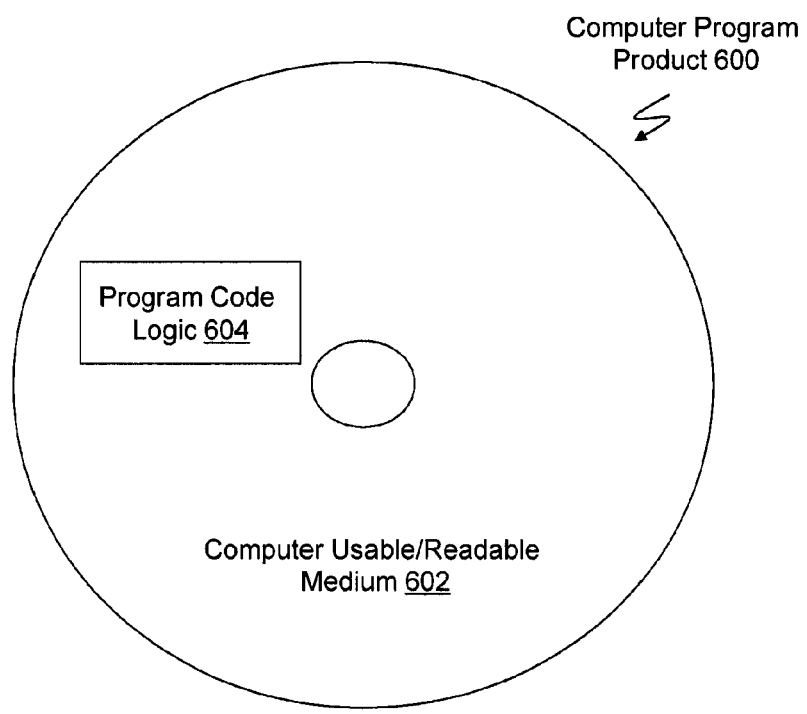
FIG. 6 illustrates a computer program product according to one embodiment of the present disclosure.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the embodiments. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the embodiments. When implemented on a general-purpose microprocessor, the computer program code logic 604 segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

While preferred embodiments have been described above, it will be understood that those skilled in the art, both now and in the future, may make various improvements and enhancements which fall within the scope of the claims which follow.

What is claimed is:

1. A method for transmitting data in a network, comprising:

initiating, by a processor, a data transmission operation from the processor to a storage device via a network, the network including a plurality of paths between the processor and the storage device;

detecting, by the processor, a recurring intermittent error in one or more paths of the plurality of paths by determining whether the one or more paths have suffered at least a number of errors, the number of errors dynamically adjusted based on performance changes of one or more applications or based on data packet delivery delay; and disabling access to the one or more paths based on detecting the recurring intermittent error.

2. The method of claim 1, further comprising:

determining a burden on a data transmission capability of the processor caused by disabling access to the one or more paths, and disabling access to the one or more paths based on a determination that the burden is less than a threshold burden.

3. The method of claim 1, wherein the number of errors are suffered by the one or more paths within a predetermined duration of time.

4. The method of claim 1, wherein the recurring intermittent error is a time-out on the one or more paths.

5. The method of claim 1, wherein the number of errors is greater than one.

\* \* \* \* \*